United States Patent
Norris

(10) Patent No.: US 10,824,745 B2
(45) Date of Patent: Nov. 3, 2020

(54) SYSTEM FOR ACCESSING A KERNEL SPACE OF AN OPERATING SYSTEM WITH ACCESS CONTROL FUNCTIONALITY

(71) Applicant: ServiceNow, Inc., Santa Clara, CA (US)

(72) Inventor: Jeremy Norris, Poway, CA (US)

(73) Assignee: ServiceNow, Inc., Santa Clara, CA (US)

( * ) Notice: Subject to any disclaimer, the term of this patent is extended or adjusted under 35 U.S.C. 154(b) by 568 days.

(21) Appl. No.: 15/491,232

(22) Filed: Apr. 19, 2017

(65) Prior Publication Data

US 2018/0307850 A1 Oct. 25, 2018

(51) Int. Cl.
| | |
|---|---|
| G06F 21/62 | (2013.01) |
| G06F 9/54 | (2006.01) |
| G06F 21/53 | (2013.01) |
| G06F 13/36 | (2006.01) |

(52) U.S. Cl.
CPC ............. G06F 21/62 (2013.01); G06F 9/545 (2013.01); G06F 13/36 (2013.01); G06F 21/53 (2013.01)

(58) Field of Classification Search
CPC .......... G06F 21/62; G06F 13/36; G06F 9/545; G06F 21/53
See application file for complete search history.

(56) References Cited

U.S. PATENT DOCUMENTS

| | | | |
|---|---|---|---|
| 8,972,637 B1 * | 3/2015 | Hushon, Jr. ........... | G06F 3/0689 710/74 |
| 2003/0149895 A1 | 8/2003 | Choo et al. | |
| 2007/0271594 A1 | 11/2007 | Wobber et al. | |
| 2008/0127292 A1 * | 5/2008 | Cooper ................... | G06F 21/53 726/1 |
| 2010/0031360 A1 | 2/2010 | Seshadri et al. | |

(Continued)

FOREIGN PATENT DOCUMENTS

KR 20170022797 * 3/2017 ............. G06F 21/57

OTHER PUBLICATIONS

Extended European Search Report for European Application No. 18165058.1 dated Sep. 17, 2018; 10 pgs.

(Continued)

*Primary Examiner* — Farid Homayounmehr
*Assistant Examiner* — Sanchit K Sarker
(74) *Attorney, Agent, or Firm* — Fletcher Yoder PC

(57) ABSTRACT

In an operating system with access control functionality, a request for a function that requires kernel space access can be initiated by an application and executed in the kernel space using a management mechanism having access to the kernel space. An application container within which the application executes includes a signaling mechanism permitted to access a message bus external to the application container using an access control policy of the operating system. The signaling mechanism signals that a message associated with the request is to be processed with kernel space access. An access control policy of the operating system permits the signaling mechanism to access a message bus used to transmit the message to the management mechanism. The management mechanism executes the function in the kernel space responsive to receiving the message from the message bus and determining that the function requires kernel space access.

20 Claims, 7 Drawing Sheets

(56) References Cited

U.S. PATENT DOCUMENTS

2012/0260123 A1* 10/2012 Madampath ............ G06F 9/547
714/4.1
2017/0228235 A1* 8/2017 Choi ..................... G06F 21/575

OTHER PUBLICATIONS

Garrett, Matthew; "Container Security with SELinux and CoreOS", https://coreos.com/blog/container-security-selinux-coreos.html, dated Sep. 29, 2015, 4 pp.
CSE, "Chapter 9: Case Study: Building a Secure Operating System for Linux", http://www.cse.psu.edu/~trj1/cse443-s12/docs/ch9.pdf, Date Unknown, Downloaded Feb. 17, 2017, 20 pp.
ibm.com, "Anatomy of Security-Enhanced Linux (SELinux)", Developer Works, Technical Topics, Linux, Technical Library, https://www.ibm.com/developerworks/library/l-selinux/, May 17, 2012, Downloaded Feb. 27, 2017, 7 pp.
Wiki, Archlinux, "SELinux", https://wiki.archlinux.org/index.php/SELinux, Date Unknown, Downloaded Feb. 17, 2017, 12 pp.
SELinux Project, "NB MAC—SELinux Wiki, Mandatory Access Control (MAC)", http://selinuxproject.org/page/NB_MAC, Date Unknown, Last modified Sep. 25, 2015, Downloaded Feb. 17, 2017, 2 pp.
docker.com, "Introduction to Container Security", Mar. 18, 2015, https://www.docker.com/sites/default/files/WP_Intro%20to%20container%20security_03.20.2015%20%281%29.pdf, Downloaded Feb. 17, 2017, 8 pp.

* cited by examiner

SYSTEM FOR ACCESSING A KERNEL SPACE OF AN OPERATING SYSTEM WITH ACCESS CONTROL FUNCTIONALITY

BACKGROUND

An electronic computing and communications system can process information using servers operating at a datacenter. An operating system executing on a server can include functionality for preventing unauthorized access to protected aspects of the servers.

SUMMARY

Disclosed herein are implementations of systems and techniques for accessing a kernel space of an operating system with access control functionality.

In an implementation, a system is provided for accessing a kernel space of an operating system with access control functionality. The system comprises a memory and a processor. The memory includes instructions executable by the processor to receive, by a signaling mechanism within an application container of a plurality of application containers, a request from an application for a function that requires access to the kernel space, wherein the application operates within the application container, wherein access to the kernel space and other application containers of the plurality of application containers is restricted by an access control policy of the operating system. The memory further includes instructions executable by the processor to transmit a message associated with the request from the signaling mechanism to a management mechanism outside of the application container using a message bus, wherein access to the message bus is permitted by the access control policy, wherein the management mechanism has access to the kernel space. The memory further includes instructions executable by the processor to execute the function in the kernel space by the management mechanism responsive to the management mechanism receiving the message and determining that the function requires access to the kernel space.

In an implementation, a method is provided for accessing a kernel space of an operating system with access control functionality. The method comprises receiving, by a signaling mechanism within an application container of a plurality of application containers, a request from an application for a function that requires access to the kernel space, wherein the application operates within the application container, wherein access to the kernel space and other application containers of the plurality of application containers is restricted by an access control policy of the operating system. The method further comprises transmitting a message associated with the request from the signaling mechanism to a management mechanism outside of the application container using a message bus, wherein access to the message bus is permitted by the access control policy, wherein the management mechanism has access to the kernel space. The method further comprises executing the function in the kernel space by the management mechanism responsive to the management mechanism receiving the message and determining that the function requires access to the kernel space.

In an implementation, a non-transitory computer-readable storage medium is provided. The non-transitory computer-readable storage medium comprises processor-executable routines that, when executed by a processor, facilitate a performance of operations. The operations comprise receiving a request for a function that requires access to a kernel space of an operating system from an application executing within an application container, wherein an access control functionality of the operating system restricts access to the kernel space by the application and the application container. The operations further comprise, responsive to determining that the function is eligible for execution in the kernel space, transmitting a message associated with the function to a management mechanism having access to the kernel space using a message bus, wherein access to the message bus is permitted by a security context associated with the access control functionality.

These and other aspects of the present disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
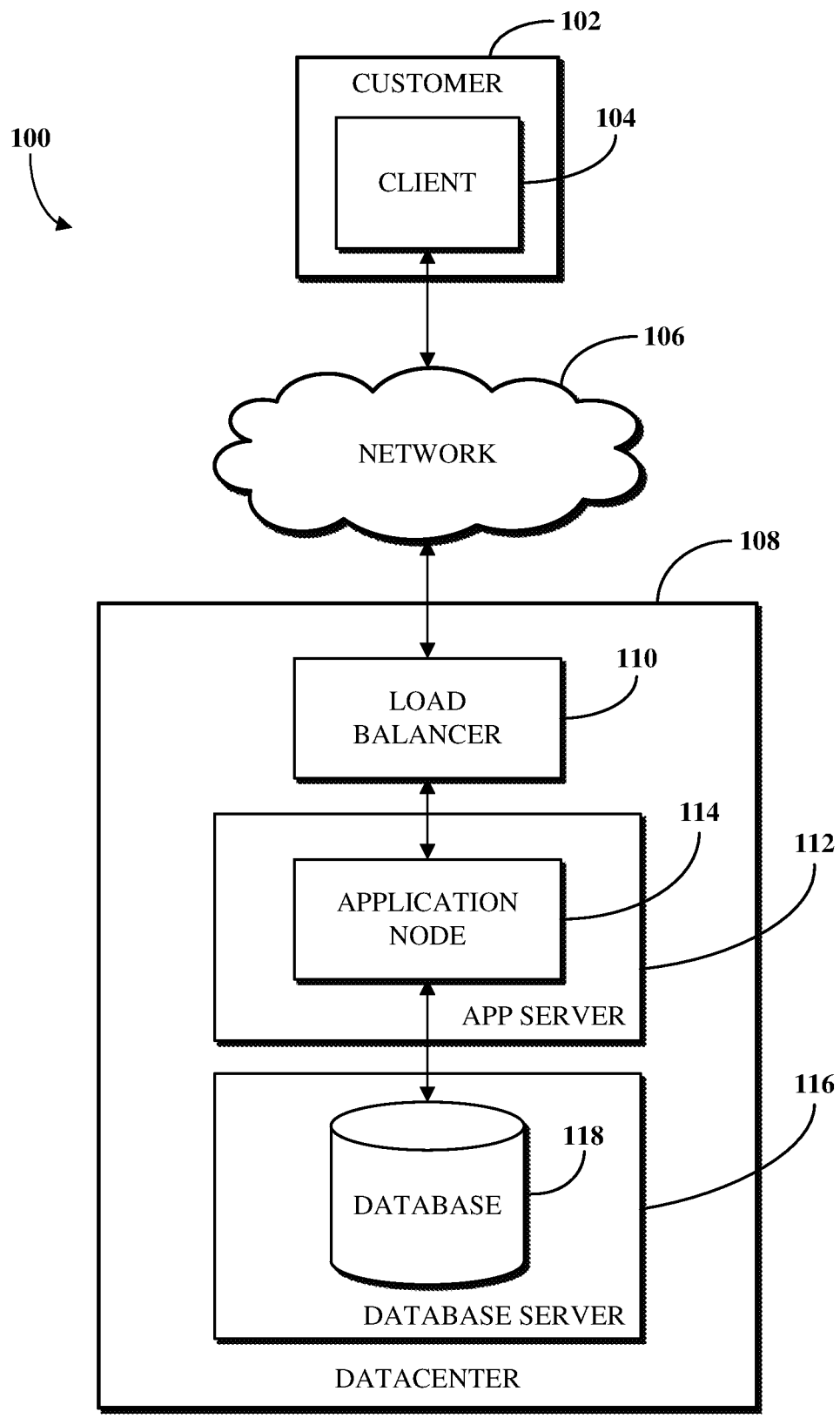
FIG. 1 is a block diagram of an example of an electronic computing and communications system.

Customers of a computing (e.g., Platform-as-a-Service (PaaS)) provider can use computing resources (e.g., instances of configurable software) provisioned by the computing provider. An instance of software can be implemented using a virtual machine, such as a Java Virtual Machine (JVM) application, a database application used for storing data accessible from software executing using the JVM, and other applications. In some cases, such as in single-tenant environments, different instances of software and their associated applications may correspond to different customers of a PaaS provider or to different instances of software used by a customer of the PaaS provider. The instances of software can be isolated from one another, such as by implementing one or more applications for each instance within an application container on a server. For example, the application containers can execute within a user space of an operating system executing on the server.

The use of separate application containers can help protect one instance of software or other software or applications from unauthorized access by another instance of software implemented on the same server. In some cases, features can be implemented in connection with the application containers (e.g., using Linux control groups (cgroups)) to limit, account for, or otherwise isolate the resource usage available to processes executing within respective ones of the application containers. To further secure the system, access control functionality can be implemented within the operating system (e.g., using a kernel security module, such as Security-Enhanced Linux (SE-Linux)) to prevent the application containers (and thus the applications executing within those application containers) from accessing the kernel space of the operating system. Such access control functionality can operate to prevent access to the kernel space or other functionality of the server if, for example, a vulnerability is exploited to access data or functionality outside of an application container. In such an event, a function that may have otherwise been executed in a kernel space of the operating system, such as by escalating to root, may be blocked using the access control functionality.

However, it may be desirable to permit an application executing within an application container limited access to the kernel space of an operating system, such as to execute functions for administrative purposes. For example, the application may require more system resources of the server to be dedicated to it or request that some system configuration corresponding to the application container be modified. Exceptions to the access control functionality of the operating system, referred to as access control policies, can be defined so that individual requests can access the kernel space, such as by granting escalated privileges for those requests. However, the definition of access control policies to accommodate all such administrative requests may require additional administrative overhead to define and audit and may unintentionally result in new vulnerabilities that, if exploited, may provide kernel space access to unauthorized requests, such as by escalating those unauthorized requests to root.

Implementations of this disclosure address problems such as these by using a signaling mechanism executed within an application container to access a message bus external to the application container. Access to the message bus is permitted by an access control policy of an operating system executing on the server. An application executing within the application container initiates a request for a function that requires access to the kernel space of the operating system. The signaling mechanism signals that a message associated with the request is to be processed with kernel space access. The signaling mechanism transmits the signaled message to a management mechanism using a message bus. The management mechanism, which has kernel space access, executes the function in the kernel space responsive to receiving the message from the message bus and determining that the function requires kernel space access. The signaling mechanism can signal functions to be executed with kernel space access using an application programming interface (API) of the management mechanism, such that the management mechanism executes a function using kernel space access when it determines that the function includes a call to its API. Through this process, access from the application container to the kernel space can be provided through a single mechanism for which a single or simpler access control policy can be defined.

Implementations of this disclosure provide technological improvements particular to computer networks, for example, those concerning mitigating the ability of applications executing within isolated application containers on a server at a datacenter from exploiting vulnerabilities to access a kernel space of an operating system of the server. Computer network-specific technological problems, such as the processing of requests received from application containers using an operating system with access control functionality (e.g., mandatory access control functionality), can be wholly or partially solved by implementations of this disclosure. For example, a signaling mechanism having an exception to the access control functionality can transmit messages from software executing within an application container to a management mechanism having access to the kernel space. The implementations of this disclosure introduce new and efficient improvements in the ways in which a server can limit the accessibility of a kernel space of an operating system without creating exceptions for instances of software executing within the application containers. The implementations of this disclosure also introduce improved maintainability for datacenter systems, such as through the controlled execution of requests requiring kernel space access from applications executing in a user space.

To describe some implementations in greater detail, reference is first made to examples of hardware structures. FIG. 1 is a block diagram of an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102, which may be a public entity, private entity, or other corporate entity or individual that purchases or otherwise uses services of a software provider, such as a PaaS service provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be software running on a customer device associated with the customer 102. As used herein, the term "software" can include, but is not limited to, applications, programs, instances, processes, threads, services, plugins, patches, application version upgrades, or any other identifiable computing aspect capable of accessing or interacting with, directly or indirectly, a database. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path, or using a distinct connection point, link, or path. A connection point, link, or path can be wired, wireless, use other communications technologies, or a combination thereof.

The network 106 can include, for example, the Internet, and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or application provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the database 118 of the database server 116.

The application server 112 can include any suitable number of application nodes, depending upon a system load or other characteristics associated with the application server 112. For example, and without limitation, the application server 112 can include two or more nodes forming a node cluster. The application nodes implemented on a single application server 112 may run on different hardware servers.

The database server 116 can be configured to store, manage, or otherwise provide data for delivering services to the client 104 over a network. The database server 116 may include a data storage unit, such as a database 118, which can be accessible by an application executed on the application node 114. The database 118 may be implemented as a relational database management system (RDBMS), an object database, an XML database, a configuration management database (CMDB), a management information base (MIB), one or more flat files, other suitable non-transient storage mechanisms, or a combination thereof. By way of non-limiting example, the system 100, in some implementations, can include an XML database and a CMDB. While limited examples are described, the database 118 can be configured as or comprise any suitable database type. Further, the system 100 can include one, two, three, or any suitable number of databases configured as or comprising any suitable database type or combination thereof.

In some implementations, the database 118 can be configured as or comprise a CMDB. A CMDB can comprise a plurality of configuration items (CIs), attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

One or more databases (e.g., the database 118), tables, other suitable information sources, or portions or combinations thereof may be stored, managed, or otherwise provided by one or more of the elements of the system 100 other than the database server 116, such as the client 104 or the application server 112.

In some implementations, a customer instance, which may also be referred to as an instance of platform software, can be implemented using one or more application nodes 114 and one or more databases 118. For example, the one or more application nodes 114 can implement a version of the platform software, and the one or more databases 118 can store data used by the version of the platform software. The customer instance associated with the customer 102 may be different from a customer instance associated with another customer. For example, the one or more application nodes and databases used to implement the platform software and associated data of a first customer may be different from the one or more application nodes and databases used to implement the platform software and associated data of a second customer. In some implementations, multiple customer instances can use one database 118, such as wherein the database 118 includes separate catalogs or other structure for separating the data used by platform software of a first customer and platform software of a second customer.

Some or all of the systems and methods described herein can operate or be executed on or by the servers associated with the system 100. For example, an application requesting kernel space access can execute on a server at the datacenter 108, such as a server on which one or more of the application server 112 or the database server 116 operates. In some implementations, the systems and methods described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. The secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a service or application to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
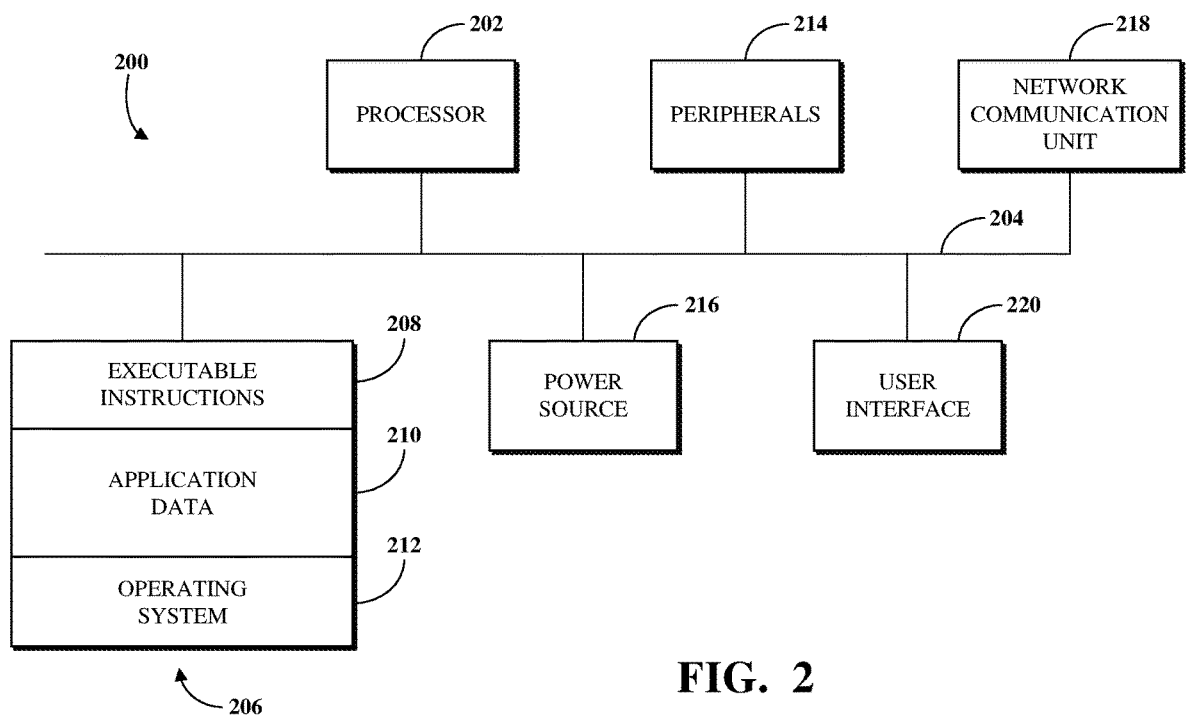
FIG. 2 is a block diagram of an example internal configuration of a computing device of an electronic computing and communications system.

FIG. 2 is a block diagram of an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices. A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although depicted here as a single bus, the bus 204 can be composed of multiple buses, which can be connected to one another through various bridges, controllers, or adapters.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to execute a function requiring kernel space access requested from an application executing within an application container on a server.

The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®; an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, a client or server can omit the peripherals 214. In some implementations, the power source 216 can be a battery, and the computing device 200 can operate independently of an external power distribution system. Any of the components of the computing device 200, such as the peripherals 214 or the power source 216, can communicate with the processor 202 via the bus 204.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Figure 3:
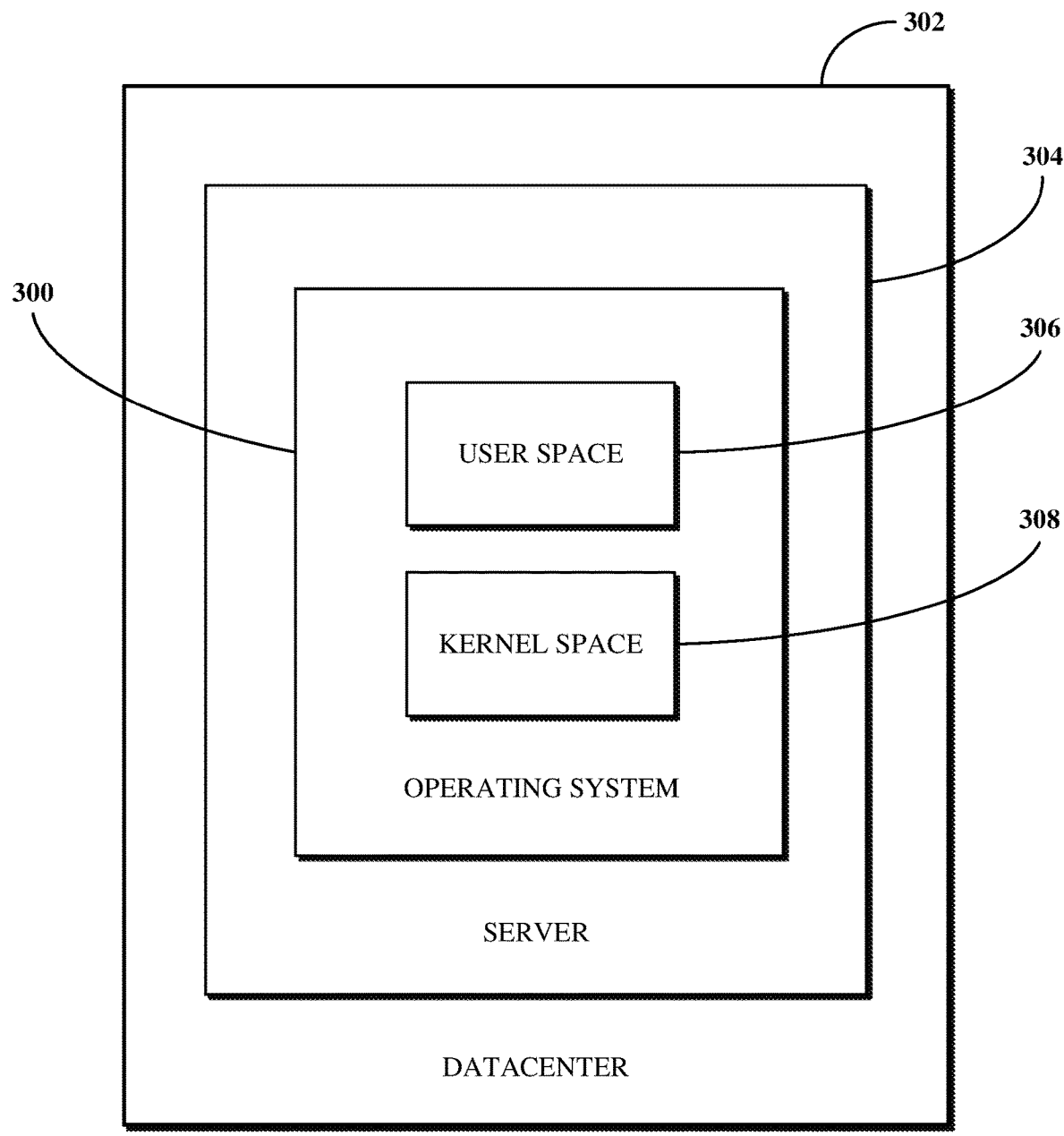
FIG. 3 is a block diagram of an example of aspects of an operating system executing on a server at a datacenter.

FIG. 3 is a block diagram of an example of aspects of an operating system 300 executing on a server at a datacenter 302. The datacenter 302 can be the datacenter 108 shown in FIG. 1. The operating system 300 is executed on a server 304 operating at the datacenter 302. The server 304 is a computing device, such as the computing device 200 shown in FIG. 2. The operating system 300, which may be the operating system 212 shown in FIG. 2, includes functionality for executing software on the server 304, for example, application nodes, such as the application node 114 shown in FIG. 1, or software for managing databases, such as the database 118 shown in FIG. 1.

The operating system 300 includes a user space 306 and a kernel space 308. The user space 306 can include allocations of memory used to execute applications or system daemons, manage input/output functionality, make system libraries available, for other purposes, or combinations thereof. For example, applications associated with one or more instances of software (e.g., versions of MySQL, MongoDB, Apache Jelly, other software, or combinations thereof) can execute in the user space 306. The kernel space 308 can include allocations of memory used by a kernel of the operating system 300, device drivers, for other purposes, or combinations thereof. For example, process scheduling systems, virtual file systems, device mappers, packet schedulers, other system software, or combinations thereof can execute in the kernel space 308.

The operating system 300 can separate allocations of memory to the user space 306 from allocations of memory to the kernel space 308, such as to protect processes executed in the kernel space 308 from being exploited by processes executed in the user space 306. For example, a software developer may develop applications executable using the operating system 300. However, if the allocations of memory used by the kernel of the operating system 300 are accessible by an application, it may in some cases be possible for the application to exploit that access, such as by making changes to the data of the kernel. Where multiple users execute applications within the user space 306, one of the users may exploit the accessibility of the kernel space 308 to gain unauthorized access to the applications of another user, such as through backend processes of the kernel space 308.

Figure 4:
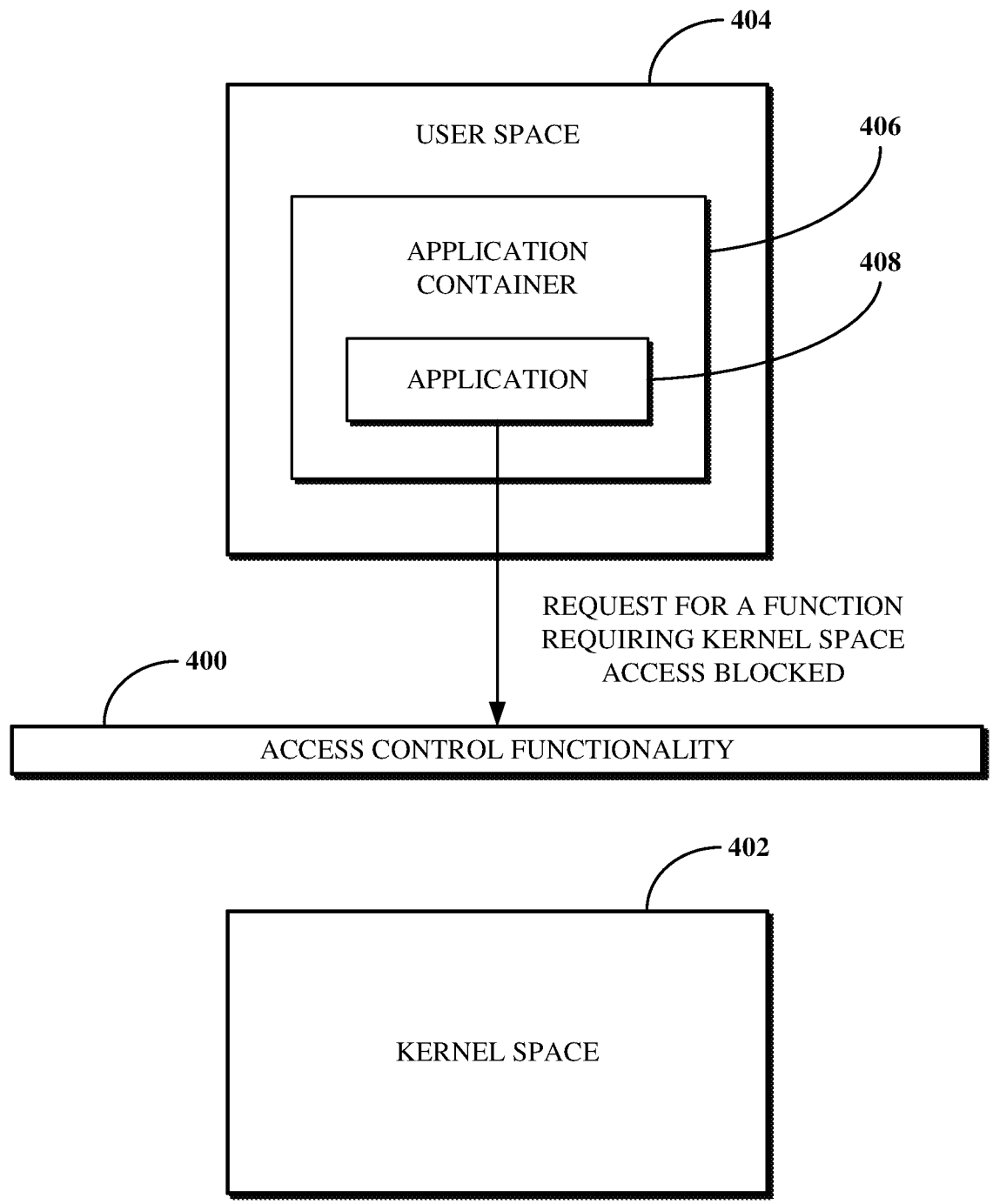
FIG. 4 is a block diagram of an example of access control functionality of an operating system for restricting access to a kernel space of the operating system.

FIG. 4 is a block diagram of an example of access control functionality 400 of an operating system for restricting access to a kernel space 402 of the operating system. The operating system (which may, for example, be the operating system 300 shown in FIG. 3) includes functionality for controlling access to the kernel space (which may, for example, be the kernel space 308 shown in FIG. 3). For example, the operating system can include the access control functionality 400 for controlling access to the kernel space 402 by processes, requests, or the like of applications executing within a user space 404 of the operating system (which may, for example, be the user space 306 shown in FIG. 3). The access control functionality 400 can be a mandatory access control functionality or another access control functionality for restricting access to the kernel space 402. The access control functionality 400 can be implemented using one or more kernel security modules, for example, SELinux.

The kernel security module that implements the access control functionality 400 introduces one or more modifications to an operating system kernel and/or tools available within an operating system user space (e.g., the user space 404). The modifications prevent requests from obtaining escalated privileges, such as may otherwise be available, for example, using the Unix sudo command. As such, without an exception to the access control functionality 400, requests initiated by applications executing in the user space 404 may still not access the kernel space 402 even where sudo (or a like command) is invoked.

One or more application containers, such as the application container 406, can operate in the user space 404. Applications, such as the application 408, can execute within one of the application containers. For example, the application 408 executes within the application container 406. The application container 406 is a virtualized environment for isolating the application 408 from other applications executing in the user space 404, such as using dedicated resources of the operating system. The application container 406 thus prevents the application 408 from accessing other applications executed in the user space 404 or from being accessed by those other applications.

If the operating system is exposed to a vulnerability that, when exploited, permits access to data or functionalities outside of the application container 406, it may be possible for a function requested by the application 408 to escape the application container 406 by exploiting that vulnerability. Once a function has escaped the application container 406, and without other measures put in place to stop it, a function requested by the application 408 could execute in the kernel space 402, such as to obtain access to different applications executing within other application containers in the user space 404. The access control functionality 400 is a security measure that can be used to prevent such an escaped function from executing in the kernel space 402.

The access control functionality 400 prevents non-excepted processes (e.g., requests for functions transmitted from the application 408) from accessing the kernel space 402 or otherwise causing functions to execute in the kernel space 402. An authorized operator, such as an administrator of the server on which the operating system executes, may define exceptions to the access control functionality 400 for particular processes that are permitted to access the kernel space 402 from the user space 404. Such an exception to the access control functionality 400 can be interchangeably referred to as a "security context." A security context can define a subject process, a target object that the subject process is permitted to access, the permissions with which the subject process is permitted to access the target object, and one or more security levels (or a range of security levels) indicating priorities and/or categories of the permissions (e.g., as compared to the permissions of other security contexts).

As shown in FIG. 4, a request for a function requiring kernel space access is transmitted from the application 408. Even if the request were to escape the application container 406, it would be blocked from accessing the kernel space 402. However, a security context of the access control functionality 400 can be created for the request. In such a case, that security context would permit the request to access the kernel space 402, such as to execute a function against one or more specified files or other objects in the kernel space 402.

Nevertheless, it may not be desirable to create security contexts for individual processes of applications, such as the application 408. For example, doing so may unintentionally cause new vulnerabilities that, if exploited, may provide kernel space access to unauthorized requests, such as by allowing those unauthorized requests to escalate to root for executing functions within the kernel space.

Implementations of the access control functionality of FIG. 4 can include additional, less, or combined functionality as compared to that described above, or functionality other than that described above, or combinations thereof. In some implementations, the access control functionality 400 can include a type enforcement access control policy wherein type identifiers are defined for subject processes and/or target objects. Security contexts can be created based on the type identifiers, and a request received from the application 408 can be checked against the type identifiers of the created security contexts to determine whether to allow the request to access the kernel space 402 or block it from accessing the kernel space 402.

In some implementations, the access control functionality 400 can include role-based access control (RBAC) functionality. The RBAC functionality allows authorized users (e.g., the server administrator) to be given a role that specifies the domains of the kernel space 402 in which the user is authorized to cause functions to execute. In some implementations, the RBAC functionality can define an additional layer of information used to create security contexts for processes, such as by defining security levels based on the role or roles of an authorized user.

In some implementations, the access control functionality 400 can include multi-level security (MLS) functionality. The MLS functionality can require that multiple access levels be required for creating security targets for specific target objects. In some implementations, the access control functionality 400 can include multi-category security (MCS) functionality. The MCS functionality can allow different JVMs to run within isolated domains. For example, the application container 406 can be associated with a specific domain wherein the application 408 is executed using a first JVM. A second application executing using a second JVM within a different application container would have a different domain, such that requests received from the second application could not be processed against the domain of the application container 406.

Figure 5:
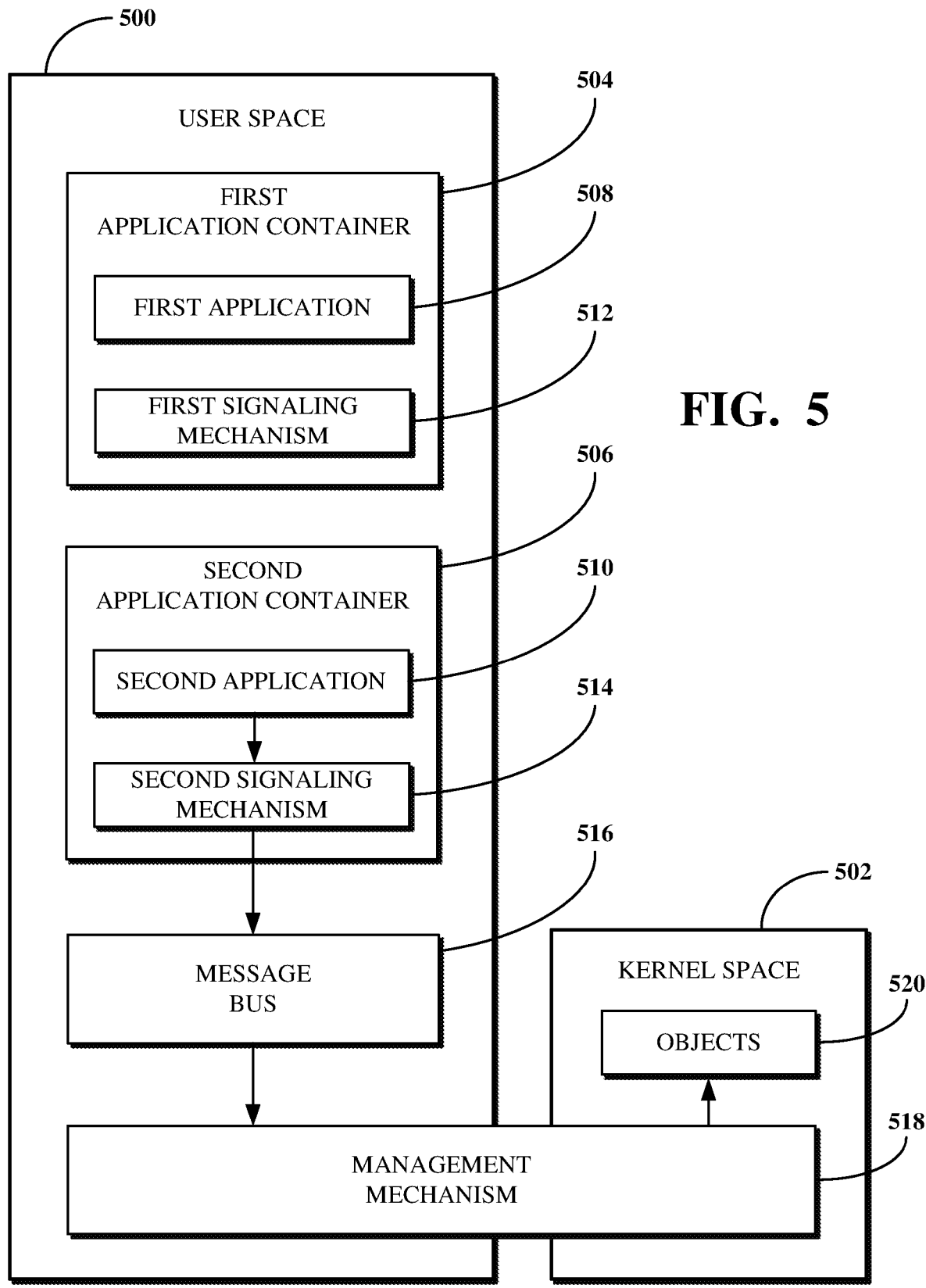
FIG. 5 is a block diagram of an example of a system for executing a function that requires kernel space access in an operating system with access control functionality.

FIG. 5 is a block diagram of an example of a system for executing a function that requires kernel space access in an operating system with access control functionality. The system includes a user space 500 and a kernel space 502. The user space 500 can be the user space 306 shown in FIG. 3 and/or the user space 404 shown in FIG. 4, to the extent different. The kernel space 502 can be the kernel space 308 shown in FIG. 3 and/or the kernel space 402 shown in FIG. 2, to the extent different. The user space 500 and the kernel space 502 can be aspects of an operating system, such as the operating system 300 shown in FIG. 3. The operating system including the user space 500 and the kernel space 502 can execute on a computing device, such as the computing device 200. For example, the computing device executing the operating system that includes the user space 500 and the kernel space 502 can be a server at a datacenter, such as the server 304 of the datacenter 302 shown in FIG. 3.

The user space 500 includes one or more application containers, such as a first application container 504 and a second application container 506. The first application container 504 or the second application container 506 can be the application container 406 shown in FIG. 4. The application containers of the user space 500 can include applications executing therein. For example, a first application 508 executes within the first application container 504, and a second application 510 executes within the second application container 506. The first application 508 or the second application 510 can be the application 408 shown in FIG. 4.

Processes of applications executing within the first and second application containers 504 and 506 are restricted from the first and second application containers 504 and 506 by an access control policy of the operating system including the user space 500 and the kernel space 502. For example, the access control policy can restrict functions requested by applications executing within the second application container 506 from executing within the first application container 504. The access control policy also restricts access to the kernel space 502. As such, even if a process of an application executing within the second application container 506 were to escape from the second application container 506, it would not be able to access the kernel space 502.

As described above with respect to FIG. 4, certain processes of applications executing within an application container may need to escape the application container to execute in the kernel space 502; however, creating multiple exceptions to the access control policy of the operating system (e.g., by defining multiple security contexts for processes of the applications) may unintentionally result in new vulnerabilities that, if exploited, may provide kernel space access to unauthorized requests, such as to gain unauthorized access to other applications executing in the user space 500. As such, a signaling mechanism is included within the application containers of the user space 500. For example, the first application container 504 includes a first signaling mechanism 512, and the second application container 506 includes a second signaling mechanism 514. These signaling mechanisms 512, 514 can be implemented on top of the respective application containers 504, 506, such as by installing those signaling mechanisms 512, 514 within those application containers 504, 506.

A signaling mechanism, such as the first signaling mechanism 512 or the second signaling mechanism 514, is a software mechanism that has a specific security context defined as an exception to the access control policy of the operating system. The security context defined for the signaling mechanism permits requests processed by the signaling mechanism to escape from an application container that includes the signaling mechanism. The security context defined for the signaling mechanism grants elevated privileges (e.g., as compared to those available to an application executing within an application container) to the signaling mechanism that permit it to access a message bus 516 outside of the application container. The signaling mechanism can transmit messages associated with those requests to a management mechanism 518 using the message bus 516. The management mechanism 518 has access to the kernel space 502 and can use that access to execute functions requested by the applications executing in the user space 500 against one or more objects 520 in the kernel space 502.

For example, a request to write to an opened system file in the kernel space can be initiated by the second application 510 within the second application container 506. The second signaling mechanism 514 can receive the request from the second application 510 and transmit a message associated with that request to the management mechanism 518 using the message bus 516. The management mechanism 518 can execute the system call function by writing to the opened system file.

The management mechanism 518 can execute a function in the kernel space 502 responsive to receiving a message associated with a request for the function from an application executing within an application container of the user space 500. Upon receiving the message (e.g., using the message bus 516), the management mechanism 518 can determine whether the requested function requires access to the kernel space 502. For example, where the function is an API call of the management mechanism 518 that does not need to interact with any objects of the kernel space 502, the management mechanism 518 can determine that the function does not require access to the kernel space 502. The management mechanism 518 can instead terminate the request by not executing the function. However, where at least a portion of the message corresponds to functionality of the API that requires access to the kernel space 502, the management mechanism 518 can determine that the function does require kernel space access (e.g., because it targets an object of the kernel space). The management mechanism 518 can then execute the function in the kernel space 502.

The message bus 516 and the management mechanism 518 are external to the application containers in the user space 500. As such, the signaling mechanisms included in multiple application containers can be configured to access the message bus 516 so that the management mechanism 518 can execute functions associated with requests initiated by applications executing within those application containers. For example, the first signaling mechanism 512 within the first application container 504 can also send requests to the management mechanism 518 using the message bus 516.

The message bus 516 is a software mechanism for facilitating communications of data between different software executing on a computing device. The message bus 516 can include inter-process communication functionality and/or remote procedure call functionality. The management mechanism 518 is a system daemon used to bridge the user space 500 and the kernel space 502 when appropriate. The management mechanism 518 executes as a background process on the server executing the operating system including the user space 500 and the kernel space 502.

Implementations of the system of FIG. 5 can include additional, less, or combined functionality as compared to that described above, or functionality other than that described above, or combinations thereof. In some implementations, the management mechanism 518 can include instructions for prioritizing the executions of functions corresponding to the messages it receives using the message bus 516. For example, the management mechanism 518 can prioritize the executions of functions based on an order in which the corresponding messages are received. In another example, the management mechanism 518 can prioritize certain types of system call functions before others, such as by executing functions associated with process control system calls before those associated with file management system calls, or vice versa. In some implementations, the management mechanism 518 may be a system-scheduled runner that listens for eligible requests to execute against the kernel space 502 from applications executing in the user space 500.

In some implementations, the management mechanism 518 may be software other than a system daemon. For example, the management mechanism 518 can be an application executing in the foreground of the operating system including the user space 500 and the kernel space 502. An authorized user (e.g., the server administrator) can configure the management mechanism 518 to respond to messages received using the message bus 516, such as to execute functions corresponding to those messages responsive to user commands, to change a priority order for executing those functions, for other purposes, or combinations thereof.

In some implementations, the message bus 516 can be a message queue. For example, the management mechanism 518 can incrementally retrieve messages stored within the message queue from respective signaling mechanisms. The management mechanism 518 can execute a function corresponding to a retrieved message before retrieving a next message from the message queue. In another example, multiple management mechanisms may be executing, such as where each management mechanism is configured to process messages of different types (e.g., based on an identifier associated with respective messages). Each management mechanism may search the message queue for messages that it can handle. Once a management mechanism finds a message it can handle, it can retrieve the message from the message queue. In some implementations, the message bus 516 can be another mechanism for transferring messages associated with requests initiated by applications to the management mechanism 518 or other software for interfacing with the objects 520 in the kernel space 502.

Figure 6:
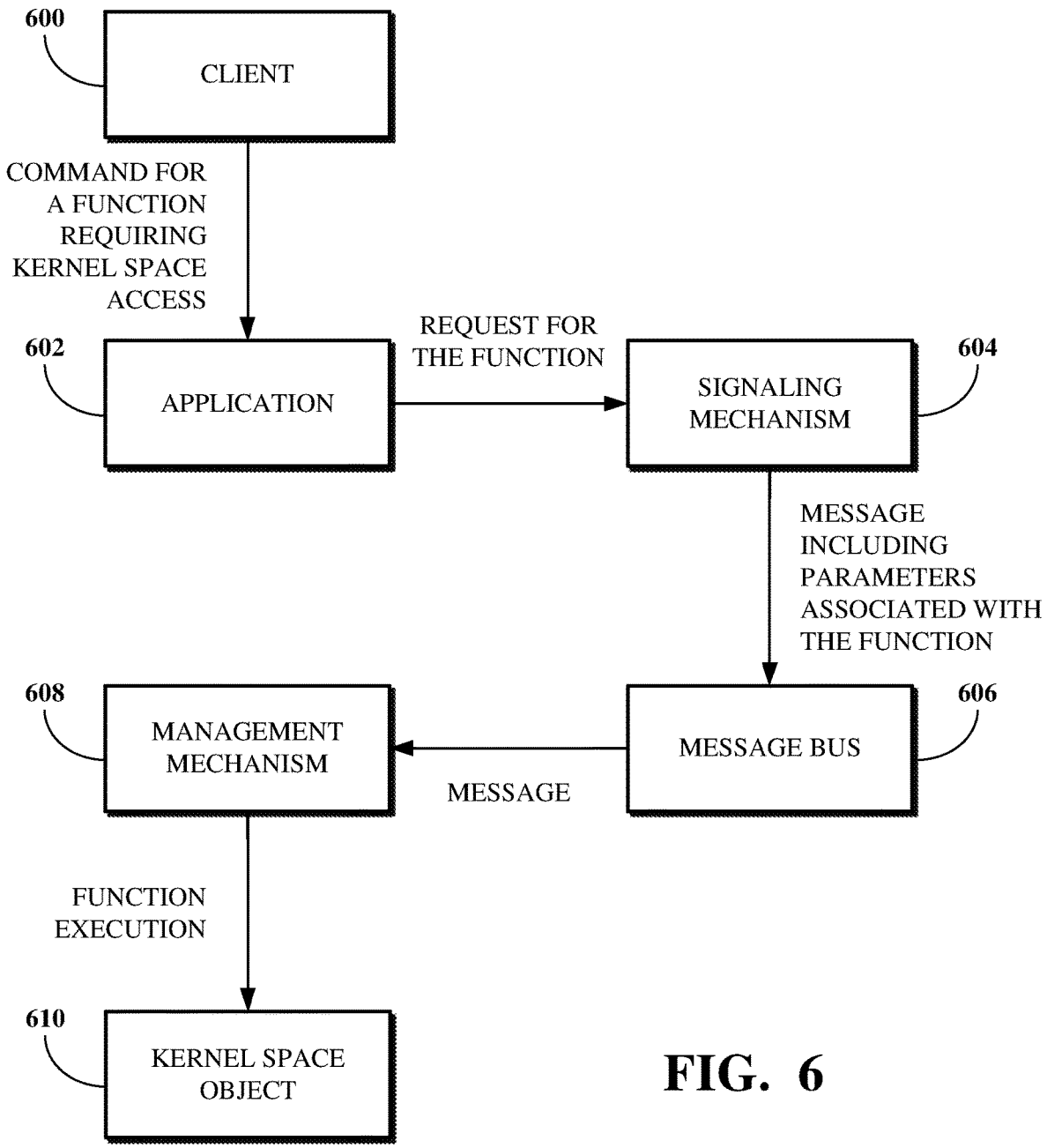
FIG. 6 is a block diagram of an example of a logic flow for executing a function that requires kernel space access in an operating system with access control functionality.

FIG. 6 is a block diagram of an example of a logic flow for executing a function that requires kernel space access in an operating system with access control functionality. At one operation of the logic flow, a client 600 transmits a command to an application 602. The command is a command for a function requiring kernel space access within the operating system. The command can be received from a shell executing on the client 600. The application 602 executes within an application container on a server on which the operating system is installed. For example, the application can be the second application 510 shown in FIG. 5. The client 600 can be a computing device, for example, the computing device 200 shown in FIG. 2. Alternatively, the client 600 can be software executing on a computing device. The client 600 can have a network interface in communication with a network interface of the server, which communication facilitates the transmission of the command from the client 600 to the application 602. The client 600 can be external to the application container within which the application 602 executes.

At a next operation of the logic flow, the application 602 initiates a request for the function requiring kernel space access and transmits the request to a signaling mechanism 604. The application 602 initiates the request based on the command received from the client 600. The signaling mechanism 604 can be the second signaling mechanism 514 shown in FIG. 5.

At a next operation of the logic flow, the signaling mechanism 604 uses a message bus 606 to transmit a message including parameters associated with the function to a management mechanism 608 that has kernel space access. The message is generated by the signaling mechanism 604 based on the request received from the application 602. The message includes parameters associated with the function. The parameters correspond to a portion of the command transmitted from the client 600 to the application 602.

The signaling mechanism 604 can generate the message responsive to a determination that the request for the function transmitted from the application 602 to the signaling mechanism 604 can be handled by an API of the management mechanism 608. If the request cannot be handled by the API of the management mechanism 608 (e.g., because no portion of the request is formatted in accordance with the API of the management mechanism 608), the signaling mechanism 604 may not generate the message. However, if the request can be handled by the API of the management mechanism, the signaling mechanism 604 can generate the message. Responsive to the message being generated, the signaling mechanism transmits the message to the management mechanism 608 using the message bus 606.

At a next operation of the logic flow, the management mechanism 608 executes the function associated with the request initiated by the application 602 against a kernel space object 610 of the kernel space of the operating system. Based on the function, executing the function against the kernel space object 610 can include reading data from or writing data to the kernel space object 610, determining a virtual location of the kernel space object 610, creating the kernel space object 610 (such as where the kernel space object 610 does not exist within the kernel space at the time the function is executed), processing other system calls, or combinations thereof. There may be other examples of executing functions against the kernel space object 610.

Implementations of the logic flow of FIG. 6 can include additional, less, or combined functionality as compared to that described above, or functionality other than that described above, or combinations thereof. In some implementations, the signaling mechanism 604 can generate the message upon receipt of the request for the function from the application 602. For example, the signaling mechanism 604 can generate the message before a determination as to whether the request can be handled by the API of the management mechanism is made.

In some implementations, the application 602 may initiate the request responsive to a determination as to whether the command received from the client 600 can be processed using the API of the management mechanism. In some implementations, the determination as to whether the request can be handled by the API of the management mechanism may not be made, for example, where the application 602 initiates the request regardless of whether the request is formatted in accordance with the API of the management mechanism 608 and/or the signaling mechanism 604 generates the message regardless of whether the message is formatted in accordance with the API of the management mechanism 608.

In some implementations, the management mechanism 608 executes the function associated with the request initiated by the application 602 in the kernel space of the operating system, but not against a particular object of the kernel space. The function can be a system call that is not directed towards one or more objects in the kernel space. For example, the function can be a process control system call, such as to terminate a process executing within one or both of the kernel space or the user space of the operating system. In another example, the function can be an information maintenance system call, such as to obtain a time or date or other system information that may not be considered an object of the kernel space. There may be other examples of executing functions in the kernel space not against an object of the kernel space.

Figure 7:
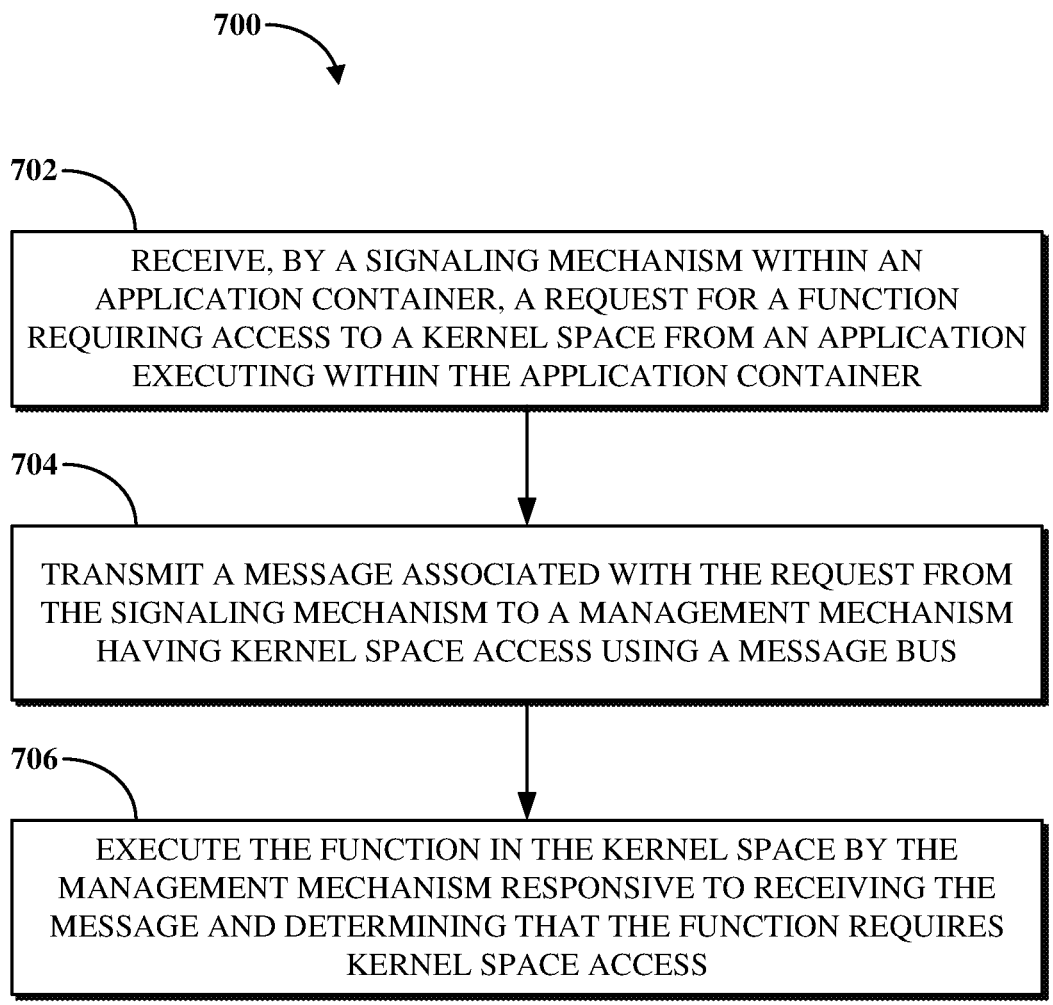
FIG. 7 is a flowchart illustrating an example of a technique for accessing a kernel space of an operating system with access control functionality.

FIG. 7 is a flowchart illustrating an example of a technique 700 for accessing a kernel space of an operating system with access control functionality. The technique 700 can be executed using computing devices, such as the systems, modules, and devices described with respect to FIGS. 1 through 6. The technique 700 can be performed, for example, by executing a machine-readable program or other computer-executable instructions, such as instructions or programs described according to JavaScript, C, or other such instructions. The steps, or operations, of the technique 700 or any other technique, method, process, or algorithm described in connection with the implementations disclosed herein can be implemented directly in hardware, firmware, software executed by hardware, circuitry, or a combination thereof.

In an implementation, the technique 700 includes receiving a request for a function requiring access to a kernel space by a signaling mechanism via 702, transmitting a message associated with the request from the signaling mechanism to a management mechanism having kernel space access using a message bus via 704, and executing the function in the kernel space by the management mechanism via 706.

At 702, a request for a function is received by a signaling mechanism from an application executing within an application container. The signaling mechanism is within the application container. The application container is located in a user space of an operating system, and the function requested by the application requires access to a kernel space of the operating system. An access control functionality of the operating system restricts the application from executing the function outside of the application container. For example, an access control policy of the operating system can define a security context that prevents the application from accessing the kernel space of the operating system.

At 704, a message associated with the request is transmitted from the signaling mechanism to the management mechanism using a message bus according to an access control policy of the operating system. For example, the same access control policy that defines the security context for preventing the application from accessing the kernel space can define another security context for permitting the signaling mechanism to access the message bus for transmitting the message to the management mechanism. In another example, the same security context that prevents the application from accessing the kernel space can also permit the signaling mechanism to access the message bus for transmitting the message to the management mechanism. In another example, a different access control policy of the operating system can define a security context for permitting the signaling mechanism to access the message bus for transmitting the message to the management mechanism.

The signaling mechanism can generate the message based on the request, for example, by converting the request into a transmittable form. The message bus can be used to transmit the message to the management mechanism over an asynchronous channel. For example, a particular channel associated with the message bus can be dedicated to passing messages from the signaling mechanism to the management mechanism, but not from the management mechanism to the signaling mechanism (e.g., as a response to the execution of the function at 706). For example, a different channel may be dedicated to passing messages from the management mechanism to the signaling mechanism and not from the signaling mechanism to the management mechanism. Alternatively, the message bus can be used to transmit the message to the management mechanism over a synchronous channel.

At 706, the management mechanism receives the message transmitted from the signaling mechanism. Responsive to receiving the message, the management mechanism determines whether the function corresponding to the message requires access to the kernel space. For example, where the function is an API call of the management mechanism that does not need to interact with any objects of the kernel space, it can be determined that the function does not require kernel space access. In such a case, the management mechanism can terminate the request by not executing the function. However, where at least a portion of the message corresponds to functionality of the API that requires access to the kernel space, it is determined that the function does require kernel space access (e.g., because it targets an object of the kernel space). The management mechanism can then execute the function in the kernel space responsive to that determination.

Although the technique 700 is shown as a series of operations for clarity, implementations of the technique 700, or any other method, process, or algorithm described in connection with the implementations disclosed herein, can be performed in various orders or concurrently. Additionally, operations in accordance with this disclosure can be performed with other operations not presented and described herein. Furthermore, one or more aspects of the systems and techniques described herein can be omitted.

In some implementations, the technique 700 includes initiating the request for the function that requires access to the kernel space of the operating system by the application executing within the application container that includes the signaling mechanism. For example, the application can initiate the request based on a command received from a shell executing on a client having a network interface in communication with a network interface of a server on which the operating system is installed. The command can include the function to be executed in the kernel space of the operating system. The command can also include parameters for executing the function in the kernel space. The application can initiate the request by processing the command, such as by converting the command into a format that can be handled by a function of an API of the management mechanism.

In some implementations, the technique 700 includes receiving a second request initiated by a second application within a second application container, transmitting a message associated with the second request from a second signaling mechanism within the second application container to the management mechanism using the message bus, and executing a function of the second request within the kernel space by the management mechanism. For example, the technique 700 can receive a number of requests by a corresponding number of signaling mechanisms executing within different application containers within a user space of the operating system. The signaling mechanisms of the different application containers can access a common message bus within the user space, such as in accordance with one or more access control policies of the operating system. The common message bus can be used by the different signaling mechanisms to transmit respective ones of the number of requests to a common management mechanism having kernel space access.

In some implementations, the signaling mechanism may not receive the request at 702 unless the request is formatted in accordance with an API of the management mechanism. For example, the application may not be able to transmit the request to the signaling mechanism, or the signaling mechanism can otherwise restrict receipt of (or be restricted from receiving) the request from the application. In some implementations, the signaling mechanism may receive the request from the application regardless of the format of the request. For example, the signaling mechanism may restrict transmission of (or be restricted from transmitting) a message associated with the request to the management mechanism where, after the request is received by the signaling mechanism, it is determined that the request is not formatted in accordance with the API of the management mechanism.

In some implementations, such as where the message bus is configured to receive and transmit data, transmitting the message via 704 can include the signaling mechanism transmitting the message to the message bus and the message bus transmitting the message to the management mechanism. In some implementations, transmitting the message via 704 can include the signaling mechanism transmitting the message to the message bus at 704 and the message bus transmitting the message to the management mechanism via a subsequent operation. In some implementations, the management mechanism receives the message from the signaling mechanism at 706, determines that the function requires kernel space access via a subsequent operation, and executes the function in the kernel space via a further subsequent operation. In some implementations, the management mechanism receives the message from the signaling mechanism and determines that the function requires kernel space access at 706 and executes the function in the kernel space via a subsequent operation.

An implementation includes means for receiving, by a signaling mechanism within an application container of a plurality of application containers, a request from an application for a function that requires access to the kernel space, wherein the application operates within the application container, wherein access to the kernel space and other application containers of the plurality of application containers is restricted by an access control policy of the operating system; means for transmitting a message associated with the request from the signaling mechanism to a management mechanism outside of the application container using a message bus, wherein access to the message bus is permitted by the access control policy, wherein the management mechanism has access to the kernel space; and means for executing the function in the kernel space by the management mechanism responsive to the management mechanism receiving the message and determining that the function requires access to the kernel space.

An implementation includes means for receiving a request for a function that requires access to a kernel space of an operating system from an application executing within an application container, wherein an access control functionality of the operating system restricts access to the kernel space by the application and the application container; and means for responsive to determining that the function is eligible for execution in the kernel space, transmitting a message associated with the function to a management mechanism having access to the kernel space using a message bus, wherein access to the message bus is permitted by a security context associated with the access control functionality.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this disclosure, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this disclosure and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if each respective reference were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for accessing a kernel space of an operating system with access control functionality, the system comprising:
   a memory; and
   a processor,
   wherein the memory includes instructions executable by the processor to cause the processor to:
      receive, via a signaling mechanism within an application container, a request from an application for a function that requires access to the kernel space, wherein the application operates within the application container, wherein the application is configured to be executed within a user space of the operating system outside of the kernel space, wherein the user space is outside of the kernel space so as to protect processes executed in the kernel space from being exploited by processes executed in the user space, and wherein an access control policy of the operating system is configured to control access to the kernel;
      transmit, via a message bus, a message associated with the request from the signaling mechanism to a management mechanism outside of the application container, wherein access to the message bus is permitted by the access control policy, and wherein the management mechanism has access to the kernel space;
      in response to transmitting the message to the management mechanism, determine that the function corresponding to the request is permitted to access the kernel space, wherein the determination is made outside the kernel space; and
      in response to determining that the function is permitted to access the kernel space, transmit the request to the kernel space for execution via the management mechanism.

2. The system of claim 1, wherein the memory includes instructions executable by the processor to cause the processor to:
   determine whether an application programming interface of the management mechanism is configured to handle the request; and
   in response to determining that the application programming interface of the management mechanism is configured to handle the request, transmit the request via the message bus.

3. The system of claim 1, wherein the memory includes instructions executable by the processor to cause the processor to:
   execute the function in the kernel space via the management mechanism.

4. The system of claim 1, wherein the access control policy defines one or more security contexts that permit the signaling mechanism to access the message bus and prevent other applications in the application container from accessing the kernel space, and wherein the one or more security contexts correspond to a property of the request transmitted from the application, such that when the request is associated with the property, the request is exempted from the access control policy.

5. The system of claim 4, wherein an additional signaling mechanism corresponding to an additional application receives an additional request from the additional application, and wherein the additional signal mechanism determines not to transmit an additional message in response to receiving the additional request to the management mechanism based on the access control policy not including a respective security context of the one or more security contexts that corresponds to the additional request.

6. The system of claim 1, wherein the message includes parameters associated with the function.

7. The system of claim 1, wherein the access control functionality is a mandatory access control functionality implemented using Security-Enhanced Linux.

8. The system of claim 1, wherein a client generates a command from a shell operating on the client, and wherein the application initiates the request based at least in part on the command.

9. A method for accessing a kernel space of an operating system with access control functionality, the method comprising:
   receiving, via a signaling mechanism within an application container, a request from an application for a function that requires access to the kernel space, wherein the application operates within the application container, wherein the application is configured to be executed within a user space of the operating system outside of the kernel space, wherein the user space is outside of the kernel space so as to protect processes executed in the kernel space from being exploited by processes executed in the user space, and wherein an access control policy of the operating system is configured to control access to the kernel space;
   transmitting, via a message bus, a message associated with the request from the signaling mechanism to a management mechanism outside of the application container using, wherein access to the message bus is permitted by the access control policy, and wherein the management mechanism has access to the kernel space;
   in response to transmitting the message to the management mechanism, determining that the function corresponding to the request is permitted to access the kernel space, wherein the determination is made outside the kernel space; and
   in response to determining that the function is permitted to access the kernel space, transmitting the request in a transmittable form to the kernel space for execution via the management mechanism.

10. The method of claim 9, wherein the message is transmitted by the signaling mechanism to the management mechanism responsive to a determination that the request can be handled by a function of an application programming interface of the management mechanism.

11. The method of claim 10, wherein determining that the function is permitted to access to the kernel space comprises:
    executing the function in the kernel space via the management mechanism.

12. The method of claim 9, wherein the operating system executes on a server having a first network interface, and wherein the method comprises:
    receiving, at the first network interface, a command for the function from a shell executing on a client, the client having a second network interface in communication with the first network interface, wherein the request is based on the command.

13. The method of claim 9, wherein the access control policy defines one or more security contexts that permit the signaling mechanism to access the message bus and prevent other applications in the application container from accessing the kernel space.

14. The method of claim 9, comprising:
receiving an additional request from an additional application within an additional application container separate from the application container; and
transmitting an additional message generated in response to the additional request to the management mechanism using the message bus, wherein the transmission occurs based at least in part on the access control policy.

15. The method of claim 9, wherein the message includes parameters associated with the function.

16. The method of claim 9, wherein the access control functionality is a mandatory access control functionality implemented using Security-Enhanced Linux.

17. A non-transitory computer-readable storage medium, comprising processor-executable routines that, when executed by a processor, cause the processor to perform operations comprising:
receiving, via a signaling mechanism within an application container, a request for a function that requires access to a kernel space of an operating system from an application executing within the application container, wherein the application is configured to be executed within a user space of the operating system outside of the kernel space, wherein the user space is outside of the kernel space so as to protect processes executed in the kernel space from being exploited by processes executed in the user space, and wherein an access control policy of the operating system is configured to control access to the kernel space;
determine that the function is eligible for execution in the kernel space;
in response to determining that the function is eligible for execution in the kernel space, transmitting, via a message bus, a message associated with the function to a management mechanism outside of the application container, wherein access to the message bus is permitted by a security context associated with access control functionality;
in response to transmitting the message to the management mechanism, determining that the function corresponding to the request is permitted to access the kernel space, wherein the determination is made outside the kernel space; and
in response to determining that the function is permitted to access the kernel space, transmitting the request in a transmittable form to the kernel space for execution of the function in the kernel space via the management mechanism.

18. The non-transitory computer-readable storage medium of claim 17, the operations comprising:
executing the function in the kernel space via the management mechanism.

19. The non-transitory computer-readable storage medium of claim 17, wherein the request is initiated by the application based on a command received from a client.

20. The non-transitory computer-readable storage medium of claim 17, wherein the function is eligible for execution in the kernel space when the request can be handled by a function of an application programming interface of the management mechanism.

* * * * *

UNITED STATES PATENT AND TRADEMARK OFFICE
CERTIFICATE OF CORRECTION

PATENT NO. : 10,824,745 B2
APPLICATION NO. : 15/491232
DATED : November 3, 2020
INVENTOR(S) : Jeremy Norris Page 1 of 1

It is certified that error appears in the above-identified patent and that said Letters Patent is hereby corrected as shown below:

In the Claims

Column 24, Line 38, Claim 9 - please remove --using-- between "container" and "wherein".

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*